United States Patent [19]

Hirame et al.

[11] 4,072,530

[45] Feb. 7, 1978

[54] REFRACTORY FURNACE WALL COATING

[75] Inventors: Yasutel Hirame, Kawaguchi; Youichi Nakamura, Hatogaya, both of Japan

[73] Assignee: Fuji Chemical Industries Company, Tokyo, Japan

[21] Appl. No.: 697,266

[22] Filed: June 17, 1976

[51] Int. Cl.² ............................................. C04B 35/52
[52] U.S. Cl. ........................................ 106/44; 106/57; 106/67; 106/68; 106/69; 106/84
[58] Field of Search .................... 106/44, 57, 67, 68, 106/69, 84

[56] References Cited

U.S. PATENT DOCUMENTS

| 2,524,358 | 10/1950 | Robey | 252/309 |
|---|---|---|---|
| 2,601,123 | 6/1952 | Moulton | 252/309 |
| 2,799,693 | 7/1957 | Dodgson | 106/69 |
| 3,576,652 | 4/1971 | Teicher | 252/309 |
| 3,607,319 | 9/1971 | Scott | 106/57 |
| 3,704,263 | 11/1972 | Rosin | 252/309 |
| 3,775,139 | 11/1973 | Gamble et al. | 106/44 |

*Primary Examiner*—Winston A. Douglas
*Assistant Examiner*—John P. Sheehan
*Attorney, Agent, or Firm*—Flynn & Frishauf

[57] ABSTRACT

Refractory furnace wall coating composition comprising from about 45 to about 65% by weight of silicon carbide, from about 10 to about 15% by weight of stabilized zirconium oxide or bentonite, from about 5 to about 10% by weight of silicon dioxide, from about 3 to about 5% by weight of hydrolyzate of poly(ethyl silicate), from about 10 to about 20% by weight of sodium silicate or aluminum phosphate, the balance being water, is disclosed.

2 Claims, 1 Drawing Figure

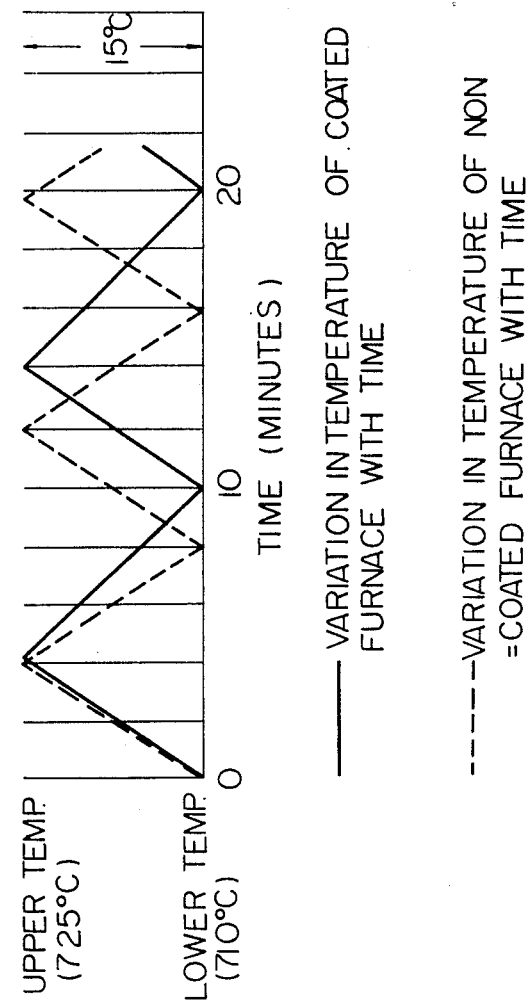

REFRACTORY FURNACE WALL COATING

BACKGROUND OF THE INVENTION

This invention relates to a refractory furnace wall coating having protective and black body heat transfer characteristics adapted for application to the hot face of furnace refractories.

A refractory furnace wall coating composition comprising calcium fluoride, silicon dioxide, calcium oxide, sodium carbonate, sodium fluoride, sodium silicate and silicon carbide is disclosed in U.S. Ser. No. 284,321 filed by Holden on May 31, 1963 now abandoned. However, according to our research, the coating disclosed in U.S. Ser. No. 284,321 has poor resistance to heat and blisters when the furnace having the coating layer has been used for a long period.

SUMMARY OF THE INVENTION

We have carried out many experiments to find a refractory furnace wall coating which has excellent radiation property of heat energy and which does not blister, i.e., give rise to blisters. As a result, we have finally found a refractory furnace wall coating satisfying the above requirements. This invention was formed on the basis of these discoveries.

An object of this invention is to provide a refractory furnace wall coating having a high reflectivity thereby improving heat efficiency of the furnace.

Another object of this invention is to provide a refractory furnace wall coating which does not blister even when the furnace having the coating layer is used for a long period.

BRIEF DESCRIPTION OF THE DRAWING

The FIGURE shows the variation in the temperature of a furnace having the coating layer with time and the variation in the temperature of the non-coated furnace with time.

DETAILED DESCRIPTION OF THE INVENTION

This invention relates to a refractory furnace wall coating composition comprising from about 45 to about 65% by weight of silicon carbide, from about 10 to about 15% by weight of a compound selected from the group consisting of stabilized zirconium oxide, bentonite or mixture thereof, from about 5 to about 10% by weight of silicon dioxide, from about 3 to about 5% by weight of hydrolyzate of poly (ethyl silicate), from about 10 to about 20% by weight of a compound selected from the group consisting of sodium silicate, aluminum phosphate, or mixture thereof, the balance being water; the percentages are based on the weight of the composition.

The term "stabilized zirconium oxide" in the specification and claims means zirconium oxide containing a small amount of magnesium oxide and a small amount of calcium oxide. Advantageously, a combined weight of magnesium oxide and calcium oxide is less than 6% by weight on the basis of weight of zirconium oxide. When zirconium oxide is heated at a temperature of 1000° C, the zirconium oxide is converted from a monoclinic system to an isometric system, and therefore, when zirconium oxide is heated to a temperature of 1000° C, it shrinks in volume by about 7%. But a stabilized zirconium oxide system, even when heated to a temperature of 1000° C, neither changes, nor shrinks.

Stabilized zirconium oxide or bentonite imparts heat resistance to the coating.

Since a hydrolyzate of poly (ethyl silicate) is insoluble in water, it may be added to the coating composition in the state of dispersion. The hydrolyzate improved the dispersion property of the coating composition. The molecular weight of poly (ethyl silicate) may be less than 1,000. In the practice of this invention, a hydrolyzate of poly (ethyl silicate) having the formula

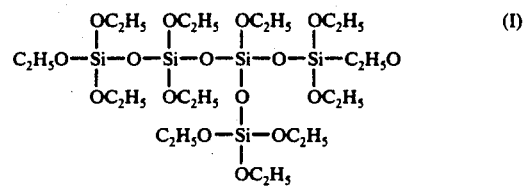

is preferred. It is thought that the hydrolyzate of poly (ethyl silicate) is a polysiloxane. The mechanism by which the hydrolysis occurs is not known at present. Therefore, the molecular weight of the polysiloxane which is thought to be formed through the hydrolysis is not clear. In the present invention the poly (ethyl silicate) is hydrolyzed before adding it to the coating composition.

Silicon oxide imparts heat resistance to the coating composition.

Sodium silicate or aluminum phosphate serves as a binder for bonding the coating to the surface of furnace.

When the coating composition on the inner surface of the furnace is baked, silicon carbide and stabilized zirconium oxide or bentonite form a eutectic crystal on the furnace together. The eutectic crystal covers the inner surface of the furnace and provides high reflectivity thereby improving the efficiency of absorption and radiation of heat energy.

Addition of silicon carbide in the range of about 45 to about 65% by weight to the coating composition is necessary for forming black bodies.

When less than 10% by weight of stabilized zirconium oxide or bentonite is added to the coating composition, it can not form a eutectic crystal together with the silicon carbide. The upper limit of stabilized zirconium oxide or bentonite is determined from an economic point of view. The use of stabilized zirconium oxide is preferred in the present invention.

Addition of silicon dioxide in the range of about 5 to about 10% by weight to the coating composition is necessary for imparting heat resistance to the coating composition.

Addition of a hydrolyzate of poly (ethyl silicate) in the range of about 3 to about 5% by weight to the coating composition is necessary for imparting the dispersion property to the coating composition.

When less than 10% by weight of sodium silicate or aluminum phosphate is added to the coating composition, a sufficient bonding force between the coating and the surface of furnace can not be obtained. Sodium silicate is basic, and aluminum phosphate is acidic. Selection of sodium silicate and aluminum phosphate depends on the nature of the refractory furnace.

The coating composition of the present invention is prepared by mixing the starting materials with stirring and by adding water to the mixture until the water content comes to 20% by volume. Advantageously, the amount of coating composition coated on the inner surface of the furnace may be adjusted to about 2.5 to 3.0 Kg/m². The coating amount is not critical, since it depends on the particular furnace.

The coating composition may be coated on a fresh refractory furnace without any treatment of the furnace. In case of a used furnace, the composition may be coated on the used furnace lining after the carbon layer on the used furnace has been removed by wire brushing.

The coating composition coated on the surface of furnace may be baked in either of the following ways:

(a) The coating composition on the furnace is heated to 1200° C over 24 hours while raising the temperature of the furnace by 50° C per each hour.

(b) The coating composition on the furnace is heated at 200° C for 4 hours, at 400° C for 3 hours and at 600° C for 3 hours.

When the composition is baked, silicon carbide forms a eutectic crystal with stabilized zirconium oxide or bentonite. The resulting eutectic crystal is resistant to a temperature of 1900° C.

In the prior art, high density hard refractory bricks have been used to make a refractory furnace having heat resistance. But, when the coating composition of the present invention is used, relatively soft bricks can be used to make a refractory furnace having resistance to heat.

As shown in the following Comparative Examples, the coating claimed in U.S. Ser. No. 284,321 filed on May 31, 1963 blistered, after the composition-coated furnace had been used for a long period.

When the coating composition of the present invention is baked on the inner surface of a furnace, a eutectic crystal composed of silicon carbide and stabilized zirconium oxide is formed. The crystal has resistance to heat. Sodium silicate or aluminum phosphate serves to bind the crystal to the inner surface of the furnace. A polysilicate improves the dispersion property of the components constituting the composition. Therefore, when the coating of the present invention is used for long period, it does not blister. In addition, since the baked coating of the present invention is hard and resistant to heat, it is unnecessary to use high quality bricks for making a refractory furnace having resistance to high temperatures.

This invention is further illustrated, but in no way limited, by the following Examples. The part and percent are by weight unless otherwise specified.

COMPARATIVE EXAMPLE 1

According to the invention given in U.S. Ser. No. 284,321 filed on May 31, 1963, the following coating composition was prepared.

| (a) | mixture (consisting of 30% of calcium fluoride, 35% of silica sand, 15% of calcium oxide, 15% of sodium carbonate and 5% of sodium fluoride) | 1 part |
|---|---|---|
| (b) | sodium silicate | 1 part |
| (c) | silicon carbide | 6 parts |
| (d) | water | 20% by volume on the basis of volume of the composition |

The resulting composition was coated on the inner surface of the following refractory furnaces.

| | Components Constituting Bricks (parts) | | | | |
|---|---|---|---|---|---|
| | SiO₂ | Al₂O₃ | Fe₂O₃ | CaO | MgO |
| Furnace resistant to 1300° C | 42.12 | 41.20 | 0.60 | 14.09 | 0.60 |
| Furnace resistant to 1500° C | 50.29 | 44.10 | 0.70 | 1.40 | 0.98 |
| Furnace resistant to 1550° C | 51.21 | 45.09 | 0.71 | 1.51 | 1.02 |

The amount of the coating composition coated was 2 Kg/m². After coating, the coating composition was dried for 24 hours at ambient temperature. Thereafter, the coating composition was heated to 1200° C over 24 hours while raising the temperature of the furnace by 50° C per each hour. The composition-coated furnace was continuously employed through 60 days or 1440 hours. Then the furnace was lowered to ambient temperature. The appearance of the inner surface of the furnace was observed. Most of the coating layer had blistered and partial peeling of the coating layer was observed.

Since the components are so low in dispersability, vigorous agitation does not necessarily insure their uniform dispersion. As a result, a relatively large proportion of the silicate binder is deposited on a limited area of the inner surface of the furnace. This uneven distribution of the binder causes blisters when the composition is suddenly polymerized by heating. In addition, due to alkalinity of the silicate, silicon carbide in the heat resistant coating layer is attacked by an alkaline material to cause peeling in said layer.

EXAMPLE 1

A coating composition comprising

| | |
|---|---|
| silicon carbide | 60 parts |
| stabilized zirconium oxide | 11 parts |
| silicon dioxide | 7 parts |
| hydrolyzate of poly (ethyl silicate) represented by the formula I | 5 parts |
| sodium silicate | 10 parts |
| water | 7 parts | was prepared. Water was added to the composition until the water content of the composition was 20% by volume.

The form, the capacity and the size of the furnace were as follows:

| | |
|---|---|
| Kind of furnace | Electric annealing furnace |
| Capacity | 1 ton/one time |
| Size | 1390 mm (diameter) × 1180 mm (length) |
| Power source, electric capacity | 200 V single phase 70 KW (upper portion 30 KW, lower portion 40 KW) |
| Temperature control | Use of thermostat (on-off system) |
| Annealing temperature | 710 – 725° C |
| Annealing method | use of pot |

| Coating Conditions | |
|---|---|
| Area of furnace coated | 6.33 m² |
| Amount of coating composition used | 15 Kg |
| Thickness of coating layer | 0.6 mm |
| Coating method | spraying |
| Baking method | The coating composition was baked by drying it for 3 days at ambient temperature and then heating it at 200° C for 8 hours, 400° C for 3 hours, 600° C for 3 |

| Coating Conditions |
|---|
| hours and 700° C for 3 hours. |

The variation in temperature of the furnace with time in the range of 710°–725° C was measured. In the control test, the variation in temperature of a non-coated furnace with time was measured. The results are shown in the FIGURE.

In the FIGURE, a declining line shows that heating of the furnace is discontinued, whereas a rising line shows that heating of the furnace is continued.

When current is shut off, it is apparent from the FIGURE that heat insulation of the furnace having the coating layer is more effective than that of the furnace not having the coating layer. When the coating composition of the present invention is coated on the inner surface of furnace, there is a 13.6% saving in electric energy. The coating layer prepared from the composition was resistant to at least 1800° C. Even when the furnace having the coating layer was continuously employed through 60 hours, no blistering nor peeling of the coating layer was detected.

EXAMPLE 2

The procedure of Example 1 was repeated except that the coating composition comprising

| | |
|---|---|
| silicon carbide | 65% |
| silicon dioxide | 6% |
| stabilized zirconium oxide | 10% |
| hydrolyzate of poly (ethyl silicate) represented by the formula I | 3% |
| sodium silicate | 10% |
| water | 6% | was used in place of the composition of Example 1.

Consumption of electric energy was reduced by 15.2%. The coating layer prepared from the composition was resistant to at least 1700° C. Even when the furnace having the coating layer was continuously employed through 60 hours, no blistering nor peeling of the coating layer was detected.

EXAMPLE 3

The procedure of Example 1 was repeated except that the coating composition comprising

| | |
|---|---|
| silicon carbide | 55% |
| bentonite | 15% |
| silicon dioxide | 5% |
| hydrolyzate of poly (ethyl silicate) represented by the formula I | 5% |
| aluminum phosphate | 12% |
| water | 8% | was used in place of the composition of Example 1.

Consumption of electric energy was reduced by 15.2%. The coating layer prepared from the composition was resistant to at least 1600° C. Even when the furnace having the coating layer was continuously employed through 60 hours, no blistering nor peeling of the coating layer was detected.

What is claimed is:

1. A refractory furnace wall coating composition comprising from about 45 to about 65% by weight of silicon carbide, from about 10 to about 15% by weight of a compound selected from the group consisting of stabilized zirconium oxide, bentonite, and a mixture thereof, from about 5 to about 10% by weight of silicon dioxide, from about 3 to about 5% by weight of a hydrolyzate of a poly (ethyl silicate), said hydrolyzate having the formula

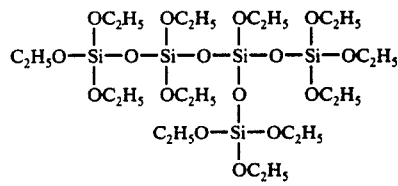

from about 10 to about 20% by weight of a compound selected from the group consisting of sodium silicate, aluminum phosphate, and a mixture thereof, the balance being water, the percent being based on the weight of the composition.

2. A refractory furnace wall coating composition comprising from about 45 to about 65% by weight of silicon carbide, from about 10 to 15% by weight of stabilized zirconium oxide, from about 5 to about 10% by weight of silicon dioxide, from about 3 to about 5% by weight of a hydrolyzate of a poly (ethyl silicate), said hydrolyzate having the formula

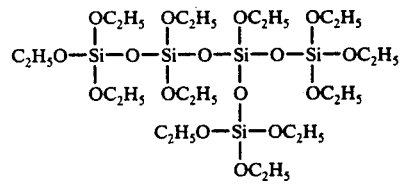

from about 10 to 20% by weight of a compound selected from the group consisting of sodium silicate, aluminum phosphate and a mixture thereof, the balance being water, the percent being based on the weight of the composition.

* * * * *